Figure 1:
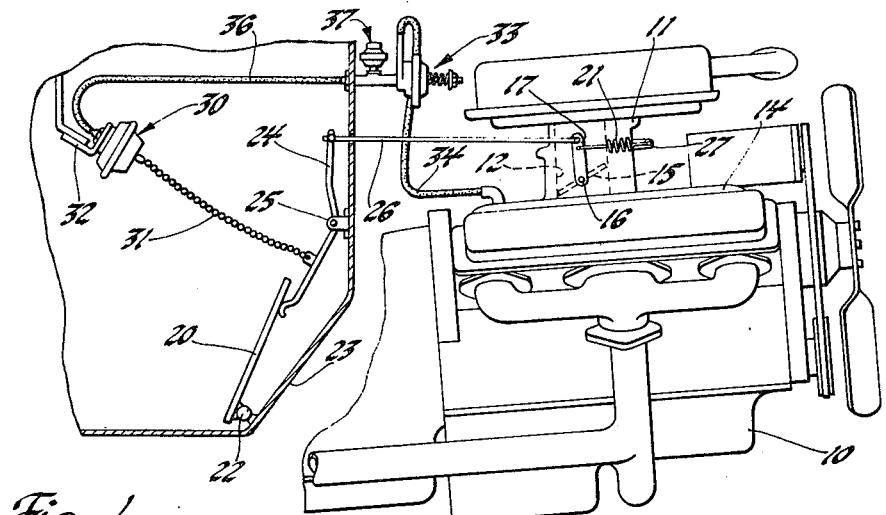

United States Patent [19]
Schniers et al.

[11] 3,982,511
[45] Sept. 28, 1976

[54] THROTTLE MOTION CONTROL DEVICE

[75] Inventors: Robert C. Schniers; David L. Van Ostrom, both of Flint, Mich.

[73] Assignee: General Motors Corporation, Detroit, Mich.

[22] Filed: Feb. 13, 1975

[21] Appl. No.: 549,542

[52] U.S. Cl. .......................... 123/103 E; 123/97 R; 180/105 R; 180/108; 180/109
[51] Int. Cl.² .......................................... F02D 11/08
[58] Field of Search ........... 123/97 R, 97 B, 103 R, 123/103 E; 180/105, 108, 109

[56] References Cited
UNITED STATES PATENTS

| | | | |
|---|---|---|---|
| 2,585,814 | 2/1952 | McDonald | 123/103 R |
| 2,825,418 | 3/1958 | Kersaman | 123/103 E |
| 3,133,610 | 5/1964 | Sheppard | 123/103 R X |
| 3,324,978 | 6/1967 | Mueller et al | 123/103 R X |

Primary Examiner—Charles J. Myhre
Assistant Examiner—William C. Anderson
Attorney, Agent, or Firm—Arthur N. Krein

[57] ABSTRACT

A throttle motion control device for an automotive vehicle engine is used to warn the driver of excessive fuel consumption by providing a stiff accelerator pedal feel when manifold vacuum drops below a given predetermined value, this being effected by means of a vacuum motor operatively connected to the accelerator pedal to apply a predetermined constant force on the accelerator pedal in the opposite direction to that applied by the driver to open the throttle, a vacuum signal being applied to the vacuum motor through a vacuum control valve from the intake manifold of the engine, the vacuum control valve opening below a preselected economical vacuum and, a vacuum regulator is interposed between the vacuum motor and the vacuum control valve to maintain the vacuum signal applied to the vacuum motor at a preselected value.

4 Claims, 2 Drawing Figures

U.S. Patent    Sept. 28, 1976    3,982,511

THROTTLE MOTION CONTROL DEVICE

This invention relates to a throttle control for an automotive vehicle engine and, in particular, to a throttle motion control device for such an engine.

Many automobile drivers operate the accelerator pedal much too rapidly during acceleration whereby the engine is not operated in the most economical manner. That is, the operator may effect a too rapid opening of the throttle valve which causes the manifold vacuum to drop below an efficient operating vacuum range. As is well known, an engine operates economically when the intake manifold vacuum is, for example, between 14 and 18.5 inches of mercury but, when the manifold vacuum drops below this range, the fuel consumption increases rapidly and, of course, the engine is then not operated in an economical manner.

In an effort to permit the average or unskilled driver to save fuel, various warning devices have been proposed which are operative to provide a visual signal to the driver to indicate, for example, when the vehicle is not being operated in an economical manner but, such a signal must be observed by the driver to be effective. In addition, various throttle control devices have been proposed to compensate for the erratic or sudden operation of the accelerator pedal by the vehicle operator as, for example, by applying a resistance to opening movement of the accelerator under certain engine operating conditions but, in such known devices, this resistance force will vary in accordance with the operating condition of the engine.

It is therefore the primary object of this invention to provide a throttle motion control device operative to provide a physical signal to a driver of an automotive vehicle when he is operating the engine of the vehicle in an uneconomical manner.

Another object of this invention is to provide a throttle motion control device in which a vacuum unit connected to the throttle linkage provides a feedback signal to the accelerator pedal of a vehicle to present a solid wall feel on the accelerator pedal when the driver is accelerating at a maximum economical rate of fuel consumption.

These and other objects of the invention are obtained by means of a throttle motion control device in which a vacuum switch connected to engine intake vacuum pressure opens below a preselected economical vacuum pressure to permit vacuum pressure to be supplied to a vacuum motor which is operatively connected to the accelerator pedal to, in effect, increase pedal effort by the driver of the vehicle, a vacuum regulator being connected to the fluid conduit passage between the vacuum switch and the vacuum motor to maintain the vacuum signal to the vacuum motor at a preselected value to insure that a predetermined constant pedal effort only is maintained.

Figure 2:
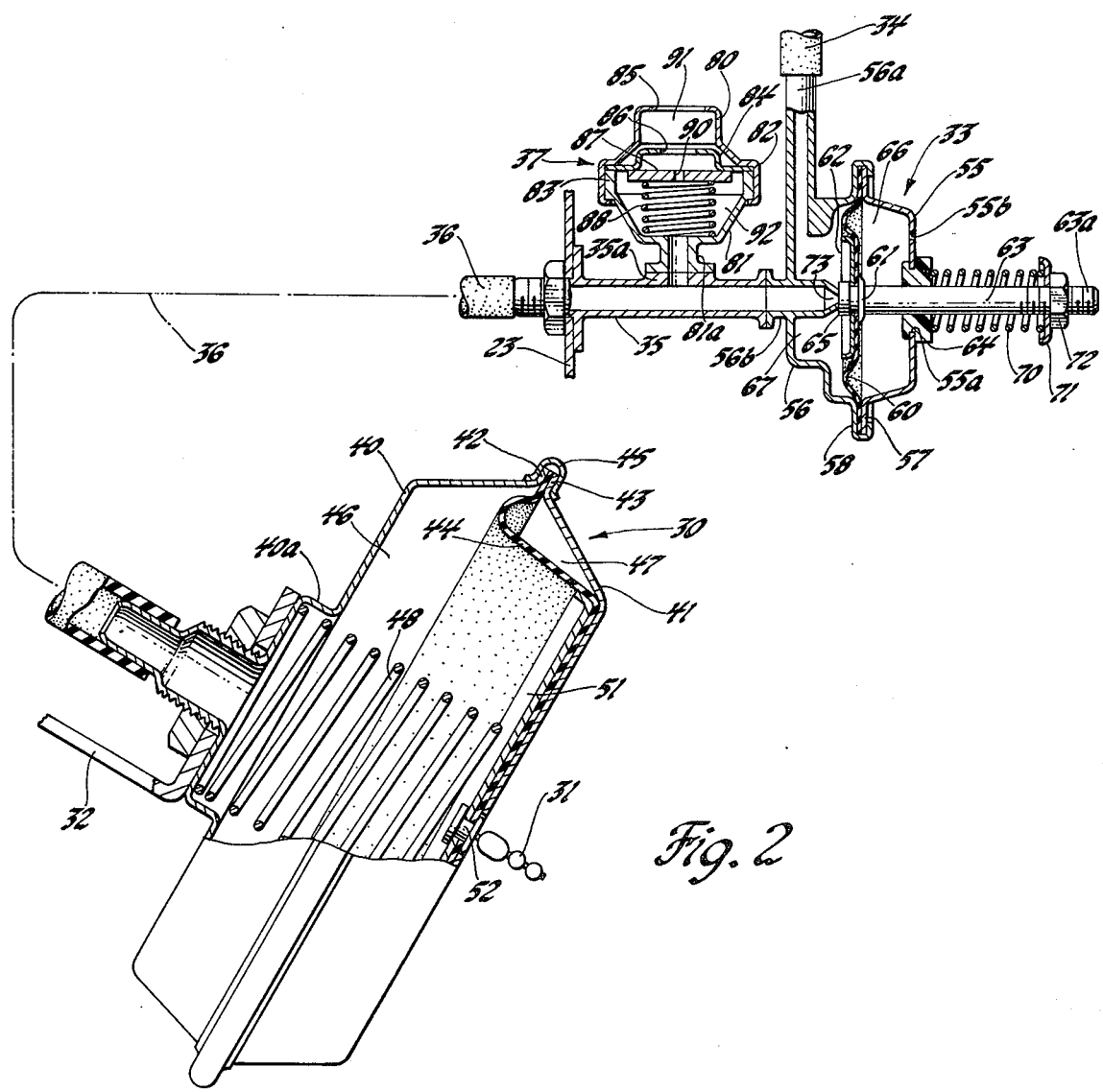

For a better understanding of the invention, as well as other objects and further features thereof, reference is had to the following detailed description of the invention to be read in connection with the accompanying drawings, wherein:

FIG. 1 is a schematic illustration of the internal combustion engine of a vehicle and the throttle control thereof with a throttle motion control device in accordance with the invention incorporated therein; and FIG. 2 is an enlarged, somewhat schematic, view with parts in section of the throttle motion control device of FIG. 1.

Referring first to FIG. 1, there is shown the internal combustion engine 10 of a vehicle having a carburetor 11 providing an induction passage 12 in communication with the intake manifold 14 of the engine. A throttle 15, mounted on a throttle shaft 16, is pivotally disposed in the induction passage 12 and is controlled by a throttle lever 17 fixed to the shaft 16. Opening movement of the throttle 15 is effected by the usual driver actuated accelerator pedal 20, while the usual throttle return spring 21 is used to effect closing movement of the throttle.

In the embodiment shown schematically in FIG. 1, the foot operated accelerator pedal 20 is pivotally mounted at one end at 22 to the vehicle support panel 23 in position to have its other end in abutment against one end of a pivot lever 24 which is pivotally mounted intermediate its ends in a pivot support 25 fixed to the support panel 23, the opposite end of the pivot lever 24 being connected to one end of the accelerator rod 26 which extends through the support panel 23 and has its other end pivotally connected to the throttle lever 17. The throttle return spring 21 is shown as being connected at one end to the throttle lever 17 and at its other end to a fixed support 27 on the engine.

As shown in FIG. 1, the accelerator pedal 20, which is normally pivoted by the driver or operator in a clockwise direction, with reference to FIG. 1, to effect opening of the throttle 15 against the biasing action of the spring 21, is also operatively connected to the throttle motion control device of the invention whereby under certain engine operating conditions, as described hereinafter, a predetermined force is applied against the accelerator pedal in a direction opposite to that in which the accelerator pedal is moved by the operator to effect opening of the throttle.

In the embodiment disclosed, this force, as provided by the vacuum motor or pneumatic power unit, generally designated 30, of the throttle motion control device, is applied by means of a flexible beaded chain 31 connected at one end to the movable power element of power unit 30 and connected at its other end to the lever 24 intermediate the end of this lever engaged by the accelerator pedal 20 and the pivotal support 25, the housing of the power unit 30 being fixed as by a support 32 to the support panel 23. The throttle motion control device of the invention also includes a vacuum control valve, generally designated 33, having its inlet connected by a hose 34 to the intake manifold 14 whereby the vacuum control valve is supplied with engine intake pressure downstream of the throttle valve 15. The outlet of the vacuum control valve 33 is connected by a conduit 35 and a hose 36 to the power unit 30, and to a vacuum pressure regulator or simply vacuum regulator, generally designated 37, interposed between the vacuum control valve 33 and the power unit 30, as by being connected to a flanged side opening 35a in conduit 35.

Referring now to FIG. 2, the power unit 30 can be of any desired configuration having a housing divided into a pair of chambers by a movable wall and, in the embodiment disclosed, is a diaphragm unit. As shown, the power unit 30 includes a housing made of two generally cup-shaped metal housing halves 40 and 41 which have flanges 42 and 43, respectively, between which the periphery of a flexible diaphragm 44 is interposed, with a metal band clip 45 encircling the flanges to secure these elements in unit assembly.

The housing half 40 is rigidly fixed in a suitable manner, as by bracket 32, to a portion of the vehicle support panel 23.

The diaphragm 44 divides the housing of the power unit into two chambers, a vacuum chamber 46 and a pressure chamber 47 and the diaphragm is normally biased to the position shown in FIG. 2 against the end wall of the casing half 41 by means of a coiled spring 48 positioned within the vacuum chamber side of the casing with one end of the spring abutting against a centrally depressed portion 40a of the casing half 40 and the other end of the spring abutting against a diaphragm retainer 51 suitably fixed to the diaphragm as by means of a fastener 52 extending through central apertures in the retainer 51 and diaphragm 44.

The pressure chamber 47, the right-hand chamber as seen in FIG. 2, is open to the atmosphere by means of the central aperture therein through which the fastener 52 and beaded chain 31, which is connected at one end to the fastener, protrude, while vacuum chamber 46, the left-hand chamber, is connected by the hose 36 and conduit 35 via the control valve 33 to a source of intake manifold vacuum pressure, as by having the inlet side of the control valve connected by hose 34 with the induction fluid in the intake manifold 14 of the engine.

Control valve 33 includes a valve casing made of two generally cup-shaped casing halves or members 55 and 56 which have flanges 57 and 58, respectively, between which the periphery of a flexible diaphragm 60 is interposed, a portion of the flange 58 being turned over the flange 57 to retain these elements in unit assembly.

The central portion of the diaphragm 60 is sandwiched between retainers 61 and 62 that are fixed at the reduced end of a rod 63 for axial movement therewith, this rod 63 slidably projecting through a sliding seal 64 secured in the aperture 55a of the casing member 55. The rod 63 also has suitably fixed at its reduced end a valve member 65 in the form of an annular disk of a suitable diameter for a purpose to be described.

The diaphragm 60 divides the housing of the control valve 33 into two chambers, one of which is a pressure chamber 66 connected by port 55b in the casing member 55 to the atmosphere, the right-hand chamber as seen in FIG. 2, and a vacuum chamber 67 and, the diaphragm is normally biased to the right as seen in this figure by means of a coiled switching spring 70 encircling the rod 63 outside of the casing of the control valve, one end of the spring 70 abutting against the seal 64 and the other end of the spring abutting against a washer retainer 71 slidable on the rod and adjustably retained axially thereon by a nut 72 engaged on the threaded end 63a of rod 63.

The chamber 67, the left-hand chamber as seen in FIG. 2, is provided with an inlet conduit portion 56a that is connected by the conduit 34 to a source of intake manifold vacuum pressure, as previously described. The chamber 67 is also connected by a conduit portion 56b of the casing member 56, located centrally thereof, via the conduit 35 and hose 36 to the power unit 30 and via the conduit 35 to the vacuum regulator 37, the conduit member 56b having a portion thereof extending into the interior of the casing into chamber 67, this portion of the conduit member 56b terminating in a reduced diameter inlet portion forming with a control orifice 73 of a predetermined size, flow through which is controlled by the valve member 65, that is coaxially aligned therewith and adapted to seat at the inboard or orifice end of the reduced diameter portion of the conduit portion 56b. Chamber 66 is in communication with the atmosphere via opening 55b in casing member 55.

Vacuum regulator 37, which in effect is a flow control valve, includes a two-piece hollow regulator casing formed, with reference to FIG. 2, by an upper casing element 80 and a lower casing element 81 which have flanges 82 and 83, respectively, between which the radial flange of a cup-shaped valve seat element 84 is interposed, a portion of the flange 83 being turned over the flange 83 to retain these elements in unit assembly.

Lower casing element 81 is provided with a flanged conduit 81a, shown formed integral therewith, fixed in a suitable manner to the flanged branch conduit 35a of conduit 35 and is thereby in fluid flow relationship to both the power unit 30 and the control valve 33. Upper casing 80 is provided with an enlarged aperture 85 therethrough which is in fluid communication with the aperture 86 in the cup base of valve seat element 84. Flow through the casing of the vacuum regulator 37 from the aperture 85 in the upper casing to the flanged conduit 81a is controlled by an annular disk valve 87 that is normally biased by a spring 88 against the flange of the valve seat element 84 and, by an orifice 90 of a predetermined size extending through the disk valve 87, the valve seat element 84 and disk valve 87, in effect, dividing the casing of the vacuum regulator into an upper chamber 91 and a lower chamber 92, with reference to FIG. 2.

Both the control valve 33 and the vacuum regulator 37 are suitably supported as by being fixed to the conduit 35 which, in turn, is secured in a suitable manner to the support panel 23.

In the operation of the throttle motion control device of the subject invention, engine manifold vacuum supplies the control signal and the operational energy for this device. The device consists, as previously described, of the vacuum control valve 33, the vacuum regulator 37 and the power unit 30.

During engine shutdown conditions, there would, of course, be no manifold vacuum pressure in the chamber 67 of the control valve 33, the pressure therein being substantially at atmospheric pressure and, accordingly, with atmospheric pressure also being present in the chamber 66, the spring 70 would cause axial movement of the diaphragm 60 in a direction, to the right from the position shown in FIG. 2, at which the valve member 65 would be unseated from the end of the conduit 56b. Under these conditions, substantially atmospheric pressure would be present in the chamber 46 of the power unit 30 so that the spring 48 would bias the diaphragm 44 to the position shown in FIG. 2. In this position of the diaphragm 44, sufficient slack would exist in the beaded chain 31 from the diaphragm to the pivot lever 24 to permit full clockwise pivotal movement of the accelerator pedal 20 to effect full opening movement of the throttle 15.

The housing of the power unit 30 is properly sized as to permit sufficient movement of the diaphragm 44, when a vacuum pressure is applied to the chamber 46, so that the slack in the beaded chain will be taken up to permit a force to be exerted by the power unit 30 against the pivot lever 24 in a direction to oppose the driver's movement of the accelerator pedal 20 in the direction to effect opening of the throttle valve 15.

During engine operation, chamber 67 of the control valve 33 is connected directly to engine manifold vacuum and, for all practical purposes, has the same pressure differential with atmosphere. When the engine 10 is operating at or above a predetermined economical vacuum pressure (determined by type and size engine, tire size, gear ratio and other well known factors), the pressure differential force between the vacuum chamber 67 and the pressure chamber 66, which is in commmunication with the atmosphere via port 55b, is applied to the diaphragm 60 and, since this force is greater than the force of the switching spring 70, the diaphragm 60 would be maintained in the position shown in FIG. 2 with the valve member 65 seated to block flow through the orifice opening 73. This allows chamber 92 in the vacuum regulator 37 and the chamber 46 in the power unit to be at atmospheric pressure since these elements are in communication with the atmosphere through the small diameter orifice 90 in the disk valve 87 of the vacuum regulator 37. In a particular embodiment, the orifice opening 73 was of, for example, .060 inch diameter, while the orifice 90 was of 0.015 inch diameter.

When the engine 10 is operating below a predetermined economical vacuum level, for example, 9 inch Hg., the switching spring force of spring 70 of the control valve 33 is greater than the pressure differential force between chambers 67 and 66 which acts on the diaphragm 60 causing the diaphragm 60 to move in a direction, to the right as seen in FIG. 2, moving the valve member 65 off the end of the conduit portion 56b to allow flow through orifice opening 73 which then allows intake manifold pressure in chamber 67 to enter chamber 92 of the vacuum regulator 37. By properly sizing the orifice 90 in the disk valve 87 of vacuum regulator 37, and by proper sizing of the disk valve 87 and the force of spring 88, a predetermined maximum vacuum pressure, for example, 2.8 inch Hg., can be maintained in the vacuum chamber 46 of the power unit 30. That is, if the amount of atmospheric air entering into the chamber 92 is insufficient to limit the vacuum pressure to the above example of 2.8 inch Hg., so that a higher vacuum pressure is momentarily obtained in the chamber 92, the differential pressure then applied against the disk valve 87 will cause it to unseat from valve seat element 84 to allow atmospheric air to more readily enter chamber 92 until the vacuum pressure of 2.8 inch Hg. is again obtained. With this vacuum pressure then supplied to the chamber 46, a pressure differential force is applied across the diaphragm 44 which is sufficient to overcome the biasing action of spring 48 to permit the diaphragm 44 to move in a direction, to the left with respect to FIG. 2, pulling on the beaded chain 31 thereby applying a force against the accelerator pedal 20 in a direction opposing the force applied thereon by the driver. This force attempts to overcome the force being applied by the driver's foot.

If the driver maintains the original force on the accelerator which was in balance with the normal accelerator return spring 21, this added force applied by the power unit 30 will cause the accelerator pedal 20 to return, in a counterclockwise direction with reference to FIG. 1, thereby moving the throttle 15 toward a closed position. This will then result in an increase in the pressure differential in the intake manifold 14 to the point of economical operation, that is, it will maintain engine vacuum at a predetermined value. The driver can, of course, defeat the throttle motion control device simply by applying more force to the accelerator pedal 20. In addition, the pressure differential in the intake manifold will approach zero when the throttle 15 is completely open, which then, in effect, disables the entire throttle motion control device and removes all added force to the accelerator pedal 20. The subject throttle motion control device thus provides a full throttle override feature to allow full throttle acceleration without added accelerator pedal force.

With proper sizing of the diaphragm 44 and of the force of spring 48, the solid-wall load feel applied against the accelerator pedal 20 by the power unit 30 can be approximately, for example, nine pounds, a load which can easily be overriden at any time by the driver. The driver can tolerate the stiff accelerator pedal characteristic provided by the subject device because the vacuum regulator 37 limits the maximum vacuum pressure available to the power unit 30 to a predetermined maximum value thereby limiting the pressure applied to the accelerator pedal to a predetermined maximum value. It should also be realized that the nut 72 also provides a means by which to vary the vacuum pressure during engine operation at which the control valve 33 is effective to supply vacuum pressure to the power unit 30.

Thus, in operation, the subject throttle motion control device presents a solid-wall feel on the accelerator pedal when the driver is accelerating at a predetermined maximum lower economical rate of fuel consumption. However, the accelerator pedal has no added load applied thereagainst when the engine is operating economically or at full throttle.

What is claimed is:

1. A throttle motion control device for an automotive vehicle internal combustion engine used to warn the driver of excessive fuel consumption, as during acceleration, by providing a stiff accelerator pedal feel when manifold vacuum drops below a predetermined value, the engine having an introduction system including a movable throttle for controlling flow through an induction passage and a manually actuated throttle control means operatively connected to the throttle to effect opening movement of the throttle, said throttle motion control device including a pneumatic power unit having a housing divided into a first chamber and a second chamber by a movable wall, said second chamber being in communication with the atmosphere, a flexible power connector operatively connected at one end to said movable wall and at its other end to said throttle control means, a vacuum control valve having an inlet and an outlet, said inlet being connectable to said induction passage, a conduit connecting said outlet to said first chamber, said vacuum control valve being operable at a predetermined vacuum pressure in said induction passage to place said first chamber in fluid communication via said outlet and said inlet with said induction passage and, a vacuum pressure regulator operatively connected to said conduit between said first chamber and said vacuum control valve to limit vacuum pressure to said first chamber of said power unit to a predetermined maximum pressure value whereby said power unit can be actuated at a predetermined vacuum pressure to apply a force of maximum predetermined value to said throttle control means in a throttle closing direction.

2. A throttle motion control device according to claim 1 wherein said vacuum pressure regulator includes a casing open at one end to the atmosphere and having a fluid flow connection at its other end to said conduit, a valve member including an apertured valve seat and a valve disk positioned in said casing for controlling flow between said opening and said fluid flow connection, and spring means positioned in said casing to normally bias said valve disk into seating engagement with said apertured valve seat, said valve disk having an orifice opening therethrough of a predetermined size in flow alignment with the aperture in said apertured valve seat.

3. A throttle motion control device according to claim 1 wherein said vacuum control valve includes a valve casing divided into a vacuum chamber and a pressure chamber by a movable differential pressure responsive means, said pressure chamber being in fluid flow relationship with the atmosphere, said vacuum chamber having said inlet and said outlet in communication therewith, said outlet including a passage means extending into said vacuum chamber and terminating in an outlet orifice next adjacent to said differential pressure responsive means, a valve fixed to said differential pressure responsive means for movement therewith and positioned in axial alignment with said outlet orifice for movement relative to said outlet orifice to control flow thereto.

4. A throttle motion control device according to claim 3 wherein said differential pressure responsive means of said vacuum control valve includes a diaphragm, a rod fixed at one end to said diaphragm and slidably extending through said housing, said rod being threaded at its free end, spring retainer means adjustably threaded on the threaded free end of said rod and, spring means encircling said rod with one end of said spring means abutting against said valve casing and the other end of said spring abutting against said spring retainer means to normally bias said diaphragm and therefore said valve in an opening direction relative to said outlet orifice.

* * * * *

UNITED STATES PATENT AND TRADEMARK OFFICE
CERTIFICATE OF CORRECTION

PATENT NO. : 3,982,511
DATED : September 28, 1976
INVENTOR(S) : Robert C. Schniers and David L. Van Ostrom It is certified that error appears in the above-identified patent and that said Letters Patent are hereby corrected as shown below:

Title page, under column entitled "References Cited", "Kersaman" should read -- Kershman --.

Column 4, line 10, "83" should read -- 82 --.

Column 6, line 36, "introduction" should read -- induction --.

Signed and Sealed this

Twenty-eighth Day of December 1976

[SEAL]

Attest:

RUTH C. MASON
Attesting Officer

C. MARSHALL DANN
Commissioner of Patents and Trademarks